W. W. CRATE.
METHOD OF MAKING ARTIFICIAL TEETH.
APPLICATION FILED FEB. 5, 1919.
1,370,192. Patented Mar. 1, 1921.
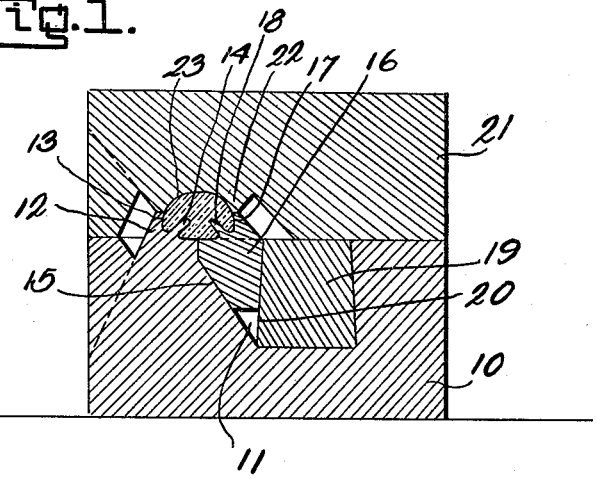
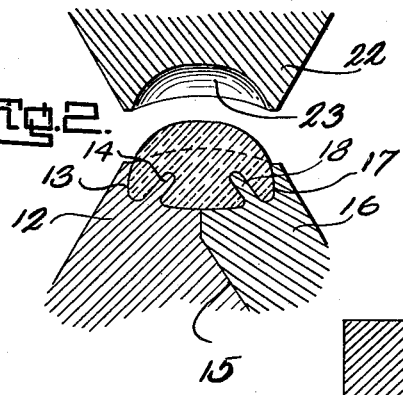
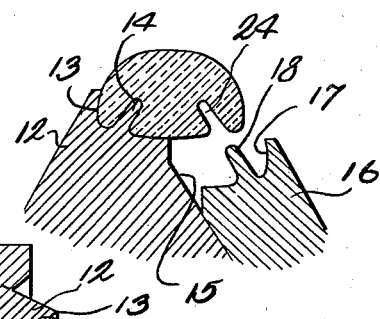
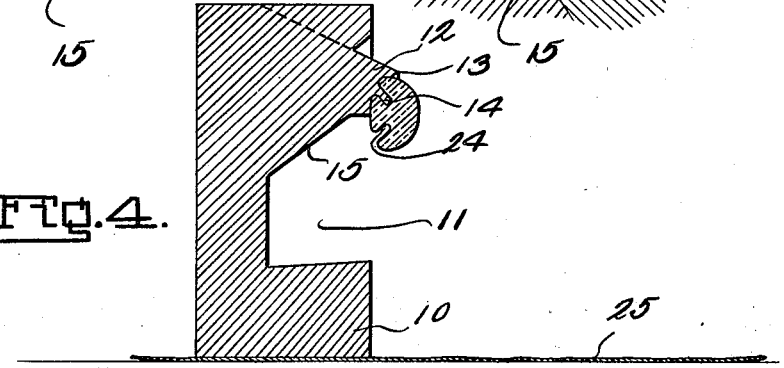
Walter W. Crate
Inventor

UNITED STATES PATENT OFFICE.

WALTER W. CRATE, OF CAMDEN, NEW JERSEY.

METHOD OF MAKING ARTIFICIAL TEETH.

1,370,192.  Specification of Letters Patent.  Patented Mar. 1, 1921.

Application filed February 5, 1919. Serial No. 275,246.

*To all whom it may concern:*

Be it known that I, WALTER W. CRATE, a citizen of the United States, residing at Camden, in the county of Camden and State of New Jersey, have invented certain new and useful Improvements in Methods of Making Artificial Teeth, of which the following is a specification.

The present invention relates to the art of general manufacturing and has particular reference to the method of making artificial teeth.

An object of the present invention is to provide a novel method or process of molding and making artificial teeth by the practice of which attaching grooves may be initially formed in the body of the teeth for receiving portions of the plate to interlock the teeth thereto, the grooves being formed without the use of cutting tools and wherein the walls of the grooves may be reinforced or hardened if the initial treatment of the teeth subsequent to molding, as the cutting of the teeth after hardening disturbs the compactness of the molded or baked mass and renders the same brittle, also incurs more labor to manufacture the article.

Another object of this invention is to provide a method of applying groove forming parts in a tooth in a manner not to disturb the molded form of the tooth and to prevent cracking or injury to the molded article during the removal of the same from the mold.

Various other objects and advantages of this method will be set forth in, and be apparent from the following detailed description of one manner of practising the novel method, the accompanying drawings illustrating one form of mold by which this novel method may be practised.

In the drawings:

Figure 1 is a transverse section through a mold, showing a molded tooth therein ready to be removed.

Fig. 2 is a fragmentary view of the same, illustrating the top or face section removed to expose the face of the molding tooth.

Fig. 3 is a like view showing the intermediate or side section withdrawn from the tooth.

Fig. 4 is a transverse view of the base section of the mold in position for the removal of the tooth therefrom to finally free the tooth from the mold.

For a clear understanding of the method, the form of apparatus shown in the accompanying drawings by which the method may be practised, will first be briefly described as follows:

Referring to the drawings, 10 designates the base section of the mold provided in its upper side with a relatively deep wide channel 11 at one side of which is formed an upstanding molding portion 12 of the base section. This portion 12 is provided in its upper and inner sides with a complemental mold recess 13 adapted to form parts of the back and one edge of the tooth and provided with a groove forming projection 14 extending in the recess and adapted to enter the plastic mass and form an attaching groove therein. The lateral wall of the channel 11 adjacent the molding projection 12 is shown in the present instance as inclined to form a guiding surface 15 which terminates at its upper end adjacent the mold recess 11 and upon which is adapted to slide an intermediate or lateral mold section 16. The mold section 16 is provided with a complemental mold recess 17 adapted to embrace the other part of the back and the other edge of the tooth and provided in the recess 17 with a groove forming projection 18 adapted to enter the plastic mass and form an attaching groove therein.

In order to practice the method of this invention, it is essential that the groove forming projections 14 and 18 extend coaxially relative to their respective complemental mold recesses 13 and 17 so that molded articles formed about the projections 14 and 18 may be withdrawn bodily therefrom and in the directions of the length thereof. It is also essential that the inclined guiding surface 15 be in a plane substantially in parallelism with the plane of the projection 18 which is carried upon the intermediate slidable mold section 16 for insuring the withdrawal of the projection 18 from the formed groove in the tooth in the direction of the longitudinal axis of the projection 18.

A key or wedge 19 is adjustably positioned in the bottom of the channel 11 of the base section and engages preferably against the lateral wall thereof remote from the inclined guiding surface 15, the key 19 tapering longitudinally and provided at its free side with a vertically inclined cam surface 20 opposed to the inclined surface 15 of the base section and adapted to engage a complementally formed side of the sliding section 16. Movement of the key 19, therefore, in one direction is adapted to raise the slidable mold section upon the inclined surface 15 and bring the complemental molding surfaces 13 and 17 into co-acting relation at the top of the base section and movement of the key or wedge 19 in the other direction is adapted to release the slidable section 16 for movement downwardly over the inclined surface 15 and away from the molded article, as shown in Fig. 3.

The mold is also provided with a top or face section 21 adapted to engage the upper surface of the base section 10 and to become pressed thereagainst in the compression of the plastic substance during molding and baking. The top section 21 is provided with a molding portion 22 of the width equal substantially to the combined width of the molding portion 12 of the base section and the molding portion of the intermediate sliding section 16 and being arranged in register therewith and with a complemental molding recess 23 in its lower surface.

The method of this invention as practised by use of the above described apparatus is as follows:

The complemental mold recesses 13, 17 and 23 are independently packed with the plastic ceramic material. It is preferable to pack the cavities or recesses which form the face of the teeth with enamel and to pack the remaining section or sections with a suitable body which may be colored or tinted so that the coloring in the body will be exposed through the transparent portion at the front surface of the tooth. In the present instance the top section 21 is provided in its cavity 23 with the enamel facing for the tooth, while the lower sections 10 and 16 are preferably packed with the body or filler as they form the back and body portions of the tooth.

The plastic material is packed in the respective cavities and the material packed into the cavities 13 and 17 is packed closely about the respective projections 14 and 18 to properly mold the plastic substance thereabout. The key is drawn into position before the packing is done. After packing the top section 21 is placed over the base section 10. The parts are suitably held and compressed together for compressing the plastic substance into the recesses and about the projections to impart the desired configuration to the article being molded. After the article is molded and baked, all of the surfaces thereof, including the inner walls of the recesses or attaching grooves 24 in the back of the tooth are inherently and originally hardened in the formation of the tooth so that the surface incrustation produced by the baking is formed within the attaching grooves or recesses of the tooth.

After baking, the incrusted tooth is removed from the mold and "fired" or "burned" lying upon an infusible fire clay tray sprinkled with silex, fusing the previously molded and compressed grooves of the tooth and providing hardened finished surfaces for the reception of the material which is forced into the same for mounting the tooth.

Before the tooth is fired but after the tooth has been molded and baked the present method provides a means for separating the mold from the tooth in a manner so as not to injure or scratch the tooth. According to the present invention, therefore, it is necessary to withdraw the projections 14 and 18 in the directions of longitudinal axes to prevent strain laterally against the walls of the recesses or grooves 24 in the tooth, and to prevent the breaking off of portions of the tooth adjacent said grooves or recesses. To this end, the top section 21 of the mold is first removed to expose the front portion or face of the tooth. The key 19 is now retracted and, by a slight jar, the intermediate section 16 is freed from the molded tooth and is permittted to move down the sliding surface 15 away from the tooth, withdrawing the projection 18 longitudinally out of the groove 24 of the tooth, as shown in Fig. 3.

The key 19 and the slidable section 16 are also removed from the base section 10 of the mold, and the base section 10 is preferably placed upon one edge, as shown in Fig. 4, and upon a suitable pad 25 of cloth or the like. By slightly tapping the base section 10 the formed tooth which may fit in the cavity 13 of the base section is jarred out of the cavity 13 and is permitted to fall in the direction of the length of the projection 14 from the mold and onto the pad 25.

The tooth thus formed has the attaching grooves 24 inherently formed therein with the advantage that the walls of the groove are of the same hardness as the exterior surfaces of the tooth and are baked and molded to form therewith. It is therefore unnecessary to further provide under cuts or grooves in the tooth body by cutting devices after the tooth is made according to the present method and the tooth possesses its inherent strength and rigidity and is not liable to cracking or breaking by subsequent handling.

I claim:

1. The method of making artificial teeth, comprising working a plastic body into a mold with an undercut attachment groove in the plastic body, and subsequently treating the molded plastic body to harden the same and impart a finish to the exterior surfaces and the inner walls of the groove of the plastic body.

2. The method of making artificial teeth, comprising molding a plastic body to the desired configuration and molding attachment grooves in the body, baking the molded body to set the same in the molded configuration and with the grooves inherently formed in the body, and firing the baked plastic body for hardening and finishing the exterior surfaces and the walls of the grooves of the body.

3. The method of making artificial teeth, comprising providing a sectional mold with a concavity formed in the meeting portions of the sections, working a plastic substance separably into the cavities of the sections and bringing the sections together to close the mold, baking the molded substance to set the same in the configuration of the concavity of the mold, and with the attachment grooves therein, and subsequently firing the molded plastic substance to harden and finish the same.

4. The method of making pinless, nonperforated artificial teeth, comprising providing a sectional mold with a concavity formed in the meeting portions of the sections, working a plastic substance separably into the concavities of the sections and bringing the sections together to close the mold, and treating the molded substance to set the same and finish the molded substance to the desired degree of hardness.

5. The method of making artificial teeth comprising providing a sectional mold with a concavity formed in the meeting portions of the sections, and with a projection in the cavity of one section, said projection at an angle to the longitudinal or transverse axis of the tooth, working plastic substance separably into the cavities of the sections and about said projection to form a groove in the plastic substance, bringing the sections of the mold together to close the same and form a molded plastic body, and treating the molded plastic body to harden the exterior surfaces and the inner walls of the grooves of the body.

6. The method of making artificial teeth comprising providing a sectional mold with a concavity formed in the meeting portions of the sections, and with a projection on one of the sections within the cavity thereof extending at an angle to either the longitudinal or transverse axis of the concavity, working a plastic substance separably into the cavities of the sections and about said projection to form a groove in the plastic substance, bringing the sections of the mold together to form a plastic body of the desired configuration, baking the plastic body while in the mold to set the plastic body, and separating the sections, the section with the projection being moved from the plastic body in a direction of the plane of said projection by means of at least two abutting surfaces arranged upon at least two sections of the mold.

7. The method of making artificial teeth, comprising providing a sectional mold with a concavity formed in the meeting portions of the sections and adjacent sections having projections in the cavities thereof spaced apart and converging toward each other, working a plastic substance into the cavities of the sections and about said projections, bringing the sections together to form a plastic body of the desired configuration, treating the plastic substance to set the same, and separating the sections of the mold by moving said adjacent sections apart in directions in the planes of said projections by means of at least two abutting surfaces arranged upon at least two sections of the mold.

8. That method of molding artificial teeth with undercut grooves therein, comprising packing a plastic substance in a mold having a slidable section with a groove forming projection adapted to engage in the plastic mass, and sliding said section on the adjacent parts of the mold in the direction of the length of the projection to release the same longitudinally from the mass.

WALTER W. CRATE.